(No Model.)

W. WILKINSON.
CORKSCREW.

No. 458,087. Patented Aug. 18, 1891.

WITNESSES,

Henry J. Stapelton
Geo. M. Cady

INVENTOR,

Walter Wilkinson
by Edson Salisbury Jones
Attorney

UNITED STATES PATENT OFFICE.

WALTER WILKINSON, OF PROVIDENCE, RHODE ISLAND, ASSIGNOR TO THE GORHAM MANUFACTURING COMPANY, OF SAME PLACE.

CORKSCREW.

SPECIFICATION forming part of Letters Patent No. 458,087, dated August 18, 1891.

Application filed May 8, 1889. Serial No. 310,059. (No model.)

*To all whom it may concern:*

Be it known that I, WALTER WILKINSON, of the city and county of Providence, and State of Rhode Island, have invented a new and useful Improvement in Corkscrews; and I do hereby declare the following specification, taken in connection with the accompanying drawings, forming a part of the same, to be a description thereof.

This invention relates to a corkscrew, the handle of which is composed of two hinged parts or members that can be turned down upon the screw proper to inclose the same and to reduce the size of the article so it can be conveniently carried in the pocket, if desired, and which can be extended to enable the article to be used in removing a cork.

The invention consists in certain features of construction and arrangement hereinafter described and claimed.

Figure 1:
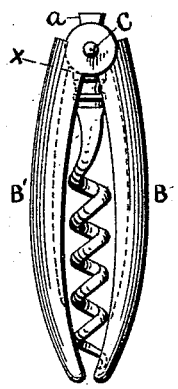
Figure 2:
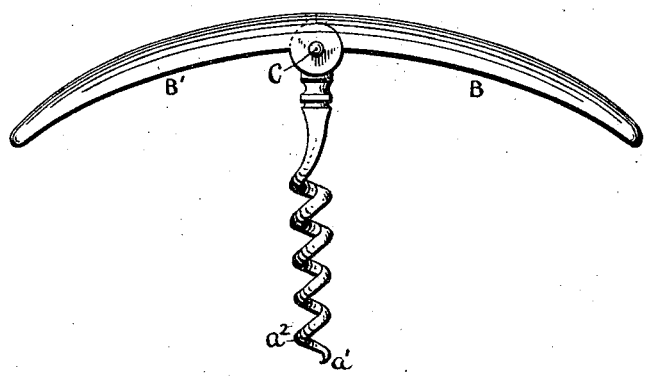
Figure 5:
Figure 3:
Figure 6:
Figure 4:
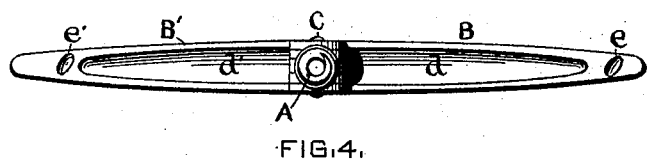
Figure 7:
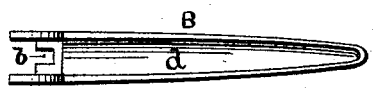

In the drawings, Figure 1 represents a side view of the corkscrew with the handle closed. Fig. 2 shows a similar view with the handle open. Fig. 3 represents a top view of the article with the handle open. Fig. 4 shows a rear view with the handle open. Fig. 5 represents a top view with the handle closed. Fig. 6 shows a transverse section through the line $x$, Fig. 1, of one of the handle members. Fig. 7 shows a rear view of one of the handle members with the groove or depression therein extending to the outer end.

A is the screw proper, and B B' are the two handle members, which are hinged or pivoted to each other and to the head of the screw by a pin $c$. Preferably the screw A is provided at its top or upper end with a projection $a$, and the handle members are respectively furnished with slots or recesses $b$ $b'$ to receive said projection when said members are open or extended, and thereby maintain the handle in a position substantially at right angles with the screw.

In order to secure strength and lightness, the handle members are preferably made tubular and the inner or under faces thereof are grooved or depressed, as at $d$ $d'$, to enable the handle members to close more closely upon the screw. These grooves or depressions may extend from end to end of the members, as shown in Fig. 7, so as to receive and protect the point of the screw; but when greater strength and roundness are desired at the outer ends the grooves $d$ $d'$ may stop short thereof and the member B be provided with a short groove $e$ to receive the point $a'$ of the screw and the member B' have a short groove $e'$ to receive the bend $a^2$ of the screw, as shown in Fig. 4. As shown in Fig. 6, the edges $f$ of the handle members are preferably rounded, so as not to present any sharp angles to the hand.

What I claim, and desire to secure by Letters Patent, is—

1. A corkscrew consisting of a screw proper having a projection $a$, and a handle composed of two members hinged to the screw and slotted or recessed on their adjacent ends to receive said projection when the handle is open, the said members being adapted to be extended to form an operating-handle for the article, substantially as set forth.

2. A corkscrew consisting of a screw proper having a projection $a$, and a handle composed of two tubular members hinged to the screw and slotted on their adjacent ends to receive said projection when the handle is open, the said members having their inner or under faces grooved or depressed and being adapted to be closed upon the screw and to be extended to form an operating-handle for the article, substantially as set forth.

3. The combination, with the screw A, having the projection $a$, of the tubular handle members B B', hinged thereto, provided with the slots $b$ $b'$, respectively, and having their inner or under faces grooved and their edges $f$ rounded, the said members being adapted to be closed upon the screw and to be extended to form an operating-handle for the article, substantially as set forth.

WALTER WILKINSON.

Witnesses:
 EDSON SALISBURY JONES,
 GEORGE M. CADY.